United States Patent
Wokaty, Jr.

(10) Patent No.: US 12,470,544 B2
(45) Date of Patent: Nov. 11, 2025

(54) SYSTEMS AND METHODS FOR AUTHENTICATION OF RESOURCE OBJECTS AT A PUBLIC PORTAL

(71) Applicant: Capital One Services, LLC, McLean, VA (US)

(72) Inventor: Robert Dwane Wokaty, Jr., Glen Allen, VA (US)

(73) Assignee: Capital One Services, LLC, McLean, VA (US)

( * ) Notice: Subject to any disclaimer, the term of this patent is extended or adjusted under 35 U.S.C. 154(b) by 212 days.

(21) Appl. No.: 18/341,738

(22) Filed: Jun. 26, 2023

(65) Prior Publication Data

US 2024/0430252 A1   Dec. 26, 2024

(51) Int. Cl.
*H04L 29/00*   (2006.01)
*H04L 9/40*   (2022.01)

(52) U.S. Cl.
CPC .......... *H04L 63/083* (2013.01); *H04L 63/102* (2013.01); *H04L 63/107* (2013.01)

(58) Field of Classification Search
CPC .... H04L 63/083; H04L 63/102; H04L 63/107
See application file for complete search history.

(56) References Cited

U.S. PATENT DOCUMENTS

| | | | |
|---|---|---|---|
| 9,088,560 B1 * | 7/2015 | Newstadt | H04L 63/08 |
| 10,189,691 B2 * | 1/2019 | High | G05D 1/0234 |
| 10,565,530 B1 * | 2/2020 | Vijayvargiya | G06Q 20/123 |
| 2016/0366144 A1 * | 12/2016 | Ashwood-Smith | G06F 21/10 |
| 2017/0371532 A1 * | 12/2017 | Panchapakesan | H04L 67/53 |
| 2018/0183795 A1 * | 6/2018 | Malizia | H04W 4/14 |
| 2019/0281531 A1 * | 9/2019 | Scarborough | H04L 67/52 |
| 2019/0287062 A1 * | 9/2019 | Skaaksrud | G05D 1/0274 |
| 2020/0358804 A1 * | 11/2020 | Crabtree | H04L 63/102 |
| 2021/0266326 A1 * | 8/2021 | Chen | H04L 67/52 |
| 2021/0288981 A1 * | 9/2021 | Numainville | H04L 63/1416 |
| 2022/0174154 A1 * | 6/2022 | Bohannon | H04L 65/4015 |
| 2022/0174155 A1 * | 6/2022 | Bohannon | H04L 67/306 |
| 2023/0104853 A1 * | 4/2023 | Bohannon | H04W 12/068 379/209.01 |
| 2023/0162533 A1 * | 5/2023 | Matsuzawa | G01P 15/18 382/115 |
| 2023/0283682 A1 * | 9/2023 | Scarborough | G07F 17/32 455/457 |

(Continued)

*Primary Examiner* — Don G Zhao
(74) *Attorney, Agent, or Firm* — Foley & Lardner LLP

(57) ABSTRACT

Systems and methods for authentication of resource objects at a public portal. In some aspects, a system, in response to receiving a resource object, requests data including: (1) a flag indicating whether a resource object associated with the resource identifier present on the resource object is under control of the user or another user and (2) a last recorded time and location associated with the resource identifier being scanned at the public portal or another public portal. The system determines that the resource object is under control of the user or another user, and responsive to that determination, determines a threshold based on time elapsed between the last recorded time and the time the resource object was received. The system, in response to determining that a distance between the public portal and the last recorded location exceeds the threshold, generates a command to escalate the resource object for further processing.

20 Claims, 4 Drawing Sheets

(56) References Cited

U.S. PATENT DOCUMENTS

| | | | |
|---|---|---|---|
| 2023/0360109 A1* | 11/2023 | Isaacson | G06Q 20/12 |
| 2023/0370439 A1* | 11/2023 | Crabtree | H04L 63/0428 |
| 2023/0370490 A1* | 11/2023 | Crabtree | H04L 63/1433 |
| 2023/0370491 A1* | 11/2023 | Crabtree | G06N 3/098 |
| 2024/0257594 A1* | 8/2024 | Skaaksrud | B25J 9/1666 |
| 2024/0430252 A1* | 12/2024 | Wokaty, Jr. | H04L 63/083 |

* cited by examiner

SYSTEMS AND METHODS FOR AUTHENTICATION OF RESOURCE OBJECTS AT A PUBLIC PORTAL

SUMMARY

Many entities incorporate unique identifiers, such as serial numbers, that identify specific instances of products and resources. For example, unique identifiers can be affixed to packaging or on a label of an item, printed onto a surface of the item, embedded into the item, etc. These unique identifiers are assigned to items by entities to track and identify products and resources throughout their lifespan. For example, these unique identifiers may be used by entities who manufacture, distribute, and consume the products and/or resources to help keep track of inventory, warranty, and authenticity.

In particular, unique identifiers such as serial numbers play a crucial role in authenticating products and preventing copying. For example, unique identifiers are typically assigned to an item or product when the item or product is created. The manufacturer can record the unique identifiers in a database accessible by various parties such as distributors, retailers, and/or consumers. By checking the serial number against the manufacturer's database, these parties can verify the authenticity of the product. However, as bad actors become more advanced, product copies have become increasingly difficult to distinguish from their genuine counterparts.

In particular, with the help of advanced manufacturing technologies and easy access to information on how to replicate products, innovative bad actors can produce products that are identical in almost every aspect to their genuine counterparts, including packaging and labeling, and even replicate unique identifiers on labeling of products. For example, tickets to events or for transportation are often resold and purchased via third-party websites, rather than directly through the actual ticketing website. Such environments make it easy for scammers to generate and sell realistic-looking tickets to events or for transportation using real serial numbers obtained through hacking or buying legitimate tickets and replicating the serial numbers on copies sold to unsuspecting consumers.

This makes it difficult for both consumers and manufacturers to identify and distinguish product copies from their genuine counterparts. Such product copies not only harm consumers but can also harm the reputation of manufacturers who distribute the counterpart genuine products. Accordingly, a mechanism is desired that would enable individuals and entities to easily perform authentication of resource objects (e.g., products, items, etc.), such as at a public portal for accepting or dispensing resource objects. One mechanism to enable authentication of resource objects may use the unique resource identifier of the object to obtain status data. The status data may be used to determine if there is a high likelihood or confidence that the object is genuine or requires further processing to determine whether the resource object is genuine or likely a copy. If there is not a high confidence that the object is genuine, the system may perform additional steps to escalate security of the resource object or of other resource objects. Therefore, methods and systems are described herein for enabling authentication of resource objects (e.g., products, items, etc.), such as at a public portal, e.g., a retail kiosk of a store.

In some aspects, an authentication system may be used to perform operations described herein. In particular, the authentication system may, in response to receiving a resource object (e.g., item, product, etc.) at a public portal, such as a retail kiosk at a store, generate a record including a time at which the resource object was received at the public portal. The authentication system may determine the unique identifier using imaging sensors, such as cameras.

The authentication system may generate, based on a unique resource identifier present on the resource object, a request for status data associated with the unique resource identifier. The status data may include: (1) a flag indicating whether a resource object associated with the unique resource identifier is under control of the user or another user and (2) a last recorded time and a last recorded location associated with the unique resource identifier being scanned at the public portal or another public portal.

In response to receiving the status data, the system may determine, based on the flag included in the status data, whether the resource object is under control of the user or another user. In response to determining that the resource object is under control of the user or another user, the system may determine a threshold distance based on an elapsed time difference between the last recorded time included in the status data and the time at which the resource object was received at the public portal.

In response to determining that a distance between a location of the public portal and the last recorded location exceeds the threshold distance, the system may generate a command to escalate the resource object for further processing. For example, the system may flag an account or resource object(s) to prevent usage of fraudulent resource objects or to prevent a fraudulent user from using the fraudulent user's account. For example, the system may generate a command for preventing usage of resource objects associated with a user account or generate, using the unique resource identifier, a command for preventing usage of the resource object.

Various other aspects, features, and advantages of the system will be apparent through the detailed description and the drawings attached hereto. It is also to be understood that both the foregoing general description and the following detailed description are examples, and not restrictive of the scope of the disclosure. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data), unless the context clearly dictates otherwise.

DETAILED DESCRIPTION

In the following description, for the purposes of explanation, numerous specific details are set forth in order to provide a thorough understanding of the disclosed embodiments. It will be appreciated, however, by those having skill in the art, that the embodiments may be practiced without these specific details, or with an equivalent arrangement. In other cases, well-known models and devices are shown in block diagram form in order to avoid unnecessarily obscuring the disclosed embodiments. It should also be noted that the methods and systems disclosed herein are also suitable for applications unrelated to source code programming.

Figure 1:
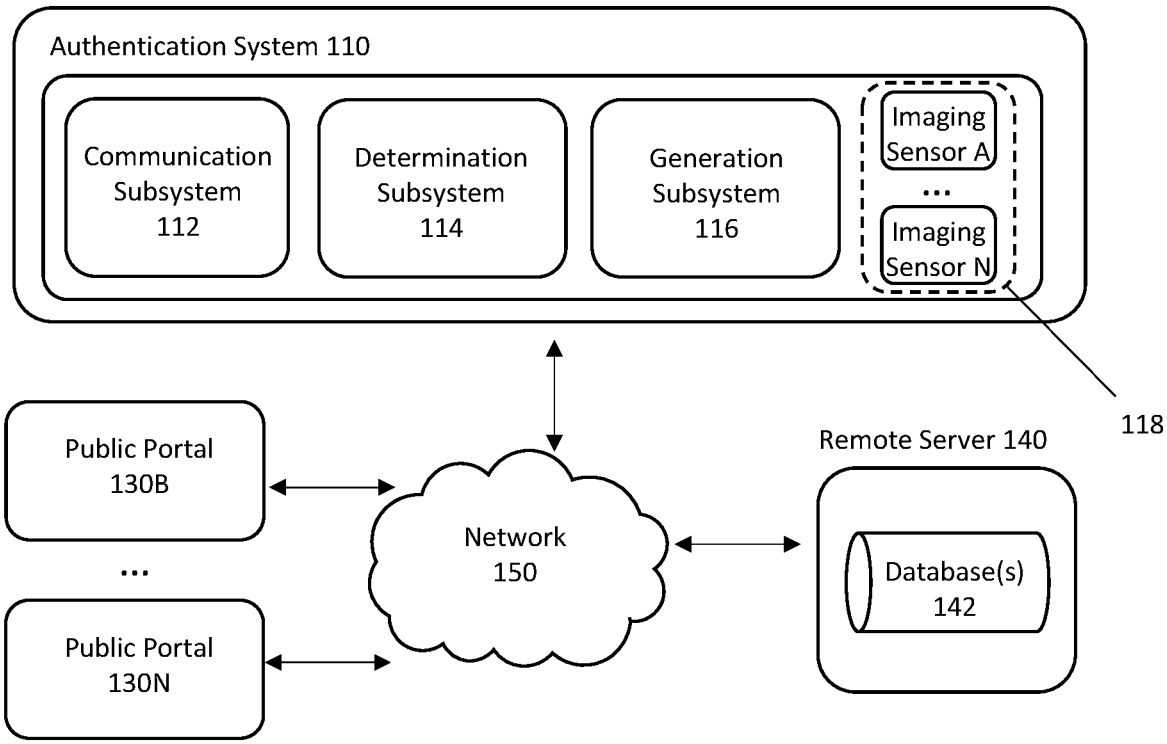
FIG. 1 shows an illustrative system for performing authentication of resource objects at a public portal, in accordance with one or more embodiments of this disclosure.

FIG. 1 shows an example of environment 100 for performing authentication of resource objects (e.g., products, items, etc.) at a public portal, such as a retail kiosk, an automated teller machine, a transportation kiosk, etc. For example, environment 100 may be used to authenticate monetary deposits at an automated teller machine. Environment 100 includes authentication system 110 hosted on or communicatively coupled to public portal 130A, other public portals 130B-N, remote server 140, and network 150. Authentication system 110, public portals 130A-N, and remote server 140 may be in communication via network 150. Network 150 may be a wired or wireless connection such as via a local area network, a wide area network (e.g., the Internet), or a combination thereof.

Authentication system 110 may include communication subsystem 112, determination subsystem 114, generation subsystem 116, and imaging sensor(s) 118A-N. Authentication system 110 may execute instructions for performing authentication of resource objects (e.g., products, items, etc.) at a public portal, such as a kiosk at a store for authenticating products, or at an automated teller machine for authenticating cash deposits.

In the example of FIG. 1, authentication system 110 is hosted on public portal 130A; however, alternatively or additionally, authentication system 110 may be hosted on one or more of public portals 130A-N and/or communicatively coupled with one or more of public portals 130A-N via a wired or wireless communication protocol. As referred to herein, a public portal may be a physical or virtual platform accessible to the public. A public portal, such as any of public portals 130A-N, may be used to provide access to information, services, products, and/or the like. For example, a public portal may include an automated teller machine, a retail kiosk, self-service stations at public transportation, or another suitable public portal. Each of the public portals may include software and/or hardware components allowing for the transmission and/or receipt of information between two or more devices, e.g., via network 150.

The public portal(s) may also include a receptacle, e.g., to enable a secure and convenient way for users to deposit or retrieve physical items such as resources for authentication. The receptacle may include a slot or opening that accepts the resource objects (e.g., items, cash, tickets, etc.) from a user and a mechanism that securely stores and transports them within the system. When a user wishes to authenticate or use a resource object, such as a ticket or a product, the user may insert the resource object into the receptacle of the public portal (e.g., via a slot).

The resource object may be received at the public portal (e.g., any of public portals 130A-N). As described herein, the user may input the resource object to authenticate the object. Alternatively, or additionally, the user may input the resource object in order to use the resource object, and authentication may automatically be performed by the system. According to some examples, the public portal may also receive other data, such as user authentication data, via a user interface. For example, the user may input, via an interface of the public portal, user authentication data such as an account number, a personal identification number (PIN), a password, biometric identification, etc., and/or other data that identifies the user at the public portal.

In response to receiving the resource object, authentication system 110 may generate a record, such as a record including data associated with the resource object and receipt of the resource object. For example, generation subsystem 116 may be used to generate a record including a time at which the resource object was received at the public portal. The record may also include other information, such as user authentication information, the location or identifier of the public portal (e.g., geographic coordinates, city, alphanumeric string identifier), and/or the type of resource item.

According to some embodiments, the system may use one or more imaging sensors to determine the unique resource identifier, e.g., serial number, etc., of the resource item. For example, authentication system 110 may use imaging sensors 118A-N to image the resource item and determine, using one or more images, a unique resource identifier. Imaging sensors 118A-N may include any sensor or device capable of imaging, such as a camera. In some examples, the imaging sensors may be specialized, such as barcode or QR code readers, so that the system may identify resource identifiers quickly and efficiently.

In some examples, the system may perform one or more image analysis techniques, such as optical character recognition (OCR), to identify a unique resource identifier based on images of the resource object obtained using one or more of imaging sensors 118A-N. In some embodiments where the input resource object is a monetary deposit comprising one or more bills, the system can analyze the image and/or scan of a bill, e.g., obtained using imaging sensors, according to one or more image analysis techniques. For example, OCR can convert image data in the image to a string of characters that is the serial number of the bill. Another image analysis technique can be a location correspondence technique to determine where the serial number is located on the bill and the orientation in which the bill was scanned. The location correspondence technique can associate a string of characters at the location with the serial number of the bill. The system can utilize the technique to know which text printed on the bill is the serial number.

In the example in which the resource is a monetary deposit of a user and the public portal is an automated teller machine, the system may scan at least one bill of the monetary deposit via a roller and/or scanner of the automated teller machine. The scan can result in an image of the bill that can be provided to other components of authentication system 110. The imaging sensor(s) may include an imaging apparatus, a roller, a feeder scanner, and/or the like. In some embodiments, the imaging sensor(s) is adapted to scan a specific location of the bill at which the serial number is located.

Based on the unique resource identifier present on the resource object (e.g., affixed to the label, printed on the resource object, presented on packaging, etc.), authentication system 110 may generate a request for status data associated with the unique resource identifier. For example, a user may input a ticket or monetary bill into a receptacle of a kiosk or an automated teller machine. The public portal hosted on the kiosk or automated teller machine may image or scan the resource using imaging sensors and obtain a serial number of the ticket or monetary bill. The serial number may then be sent to a remote server to obtain further information on the item's history.

In particular, imaging sensors 118A-N may pass at least a portion of the data obtained from imaging the resource object (e.g., the unique resource identifier) to other components of authentication system 110, such as generation subsystem 116. Generation subsystem 116 may then generate a request for status data associated with the identified unique resource identifier. The request may include the unique resource identifier and the user authentication data. Generation subsystem 116 may pass the request to communication subsystem 112. Communication subsystem 112 may transmit to a remote server (e.g., remote server 140) the request for status data associated with the unique resource identifier.

Communication subsystem 112 of authentication system 110 may include software and/or hardware components allowing for the transmission and/or receipt of information between two or more devices. For example, communication subsystem 112 may include a wireless communication module, such as a cellular radio or Wi-Fi antenna, to allow for communication over wireless networks, and/or may include a network card (e.g., a wireless network card and/or a wired network card) that is associated with software to drive the card. Communication subsystem 112 may use any of the above-mentioned techniques to transmit the request for status data and/or to receive the status data from remote server 140.

The remote server (e.g., remote server 140) may receive the request from communication subsystem 112 via network 150 and search database(s) 142 in order to find the requested status data using the unique resource identifier. Database(s) 142 may include one or more collections of data that is organized to be easily accessible, manageable, and/or updateable. It may include tables, columns and or rows that store and relate information to each other. For example, remote server 140 may query one or more databases to obtain the status data. Once the data has been located, remote server 140 may format the data and transmit the data via network 150 to authentication system 110, or to communication subsystem 112 of authentication system 110. The status data may include various types of information, such as when and where a resource associated with the resource identifier was last seen.

Figure 2:
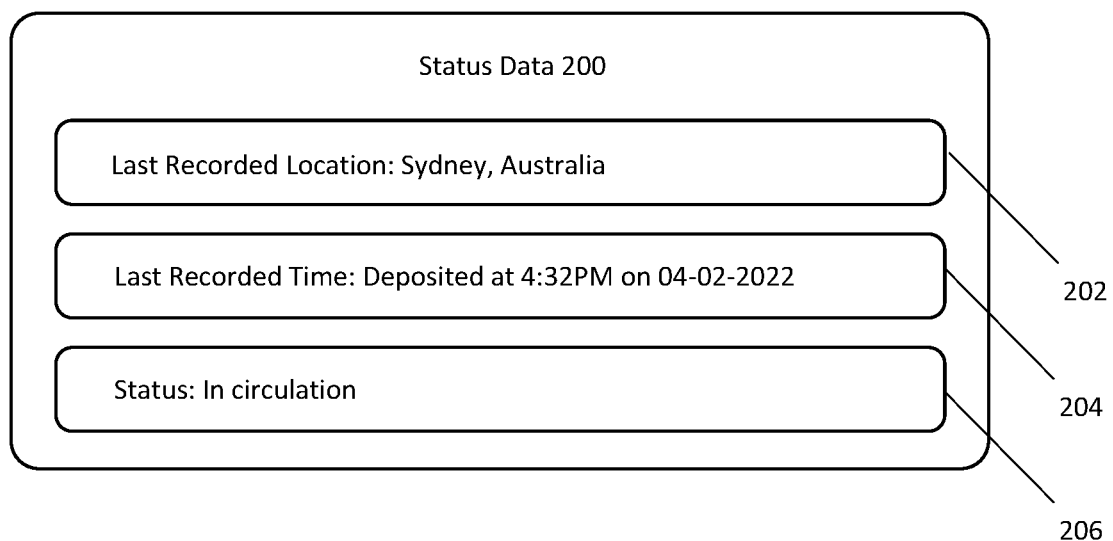
FIG. 2 illustrates an example of status data associated with a unique resource identifier, in accordance with one or more embodiments of this disclosure.

For example, FIG. 2 illustrates an example of status data 200 associated with a unique resource identifier. As described herein, authentication system 110 may receive status data 200 via communication subsystem 112 and network 150 in response to a request to remote server 140 for status data. The status data may include a flag 206, a last recorded time 204, and a last recorded location 202 associated with the unique resource identifier being scanned at the public portal or another public portal.

The flag 206 may indicate whether a resource object associated with the unique resource identifier is under control of the user or another user, e.g., as opposed to in custody of an entity or a public portal of a plurality of public portals. For example, if the flag indicates that a resource object with the same serial number is currently in custody of a different public portal and has not yet been in circulation since its creation, the system may determine with high confidence that since the resource object already in custody is genuine, the resource object being authenticated is fraudulent. Flag statuses may include whether the resource object is in circulation, e.g., in the custody or under control of a user, or not in circulation, e.g., in the custody or under control of an entity. For example, if the resource object is a monetary bill, the status may be "in circulation" if the bill is being actively used in transactions, "uncirculated" if the bill has never been used in transactions, and/or "outdated" if the bill is no longer being produced, etc.

In response to receiving the status data, authentication system 110 may determine, based on the flag included in the status data, whether the resource object is under control of the user or another user. For example, communication subsystem 112, in response to receiving the status data, may pass at least a portion of the data included in the status data to determination subsystem 114. Determination subsystem 114 may determine, based on a value of the flag, that the resource object is under control of the user or another user. For example, the flag may be a numerical value such as "0" or "1" corresponding to whether or not the resource object is under control (e.g., under custody) of a user (e.g., the user inserting the resource object, or other users). In other examples, the flag may be of a string value indicating that it is "in circulation," e.g., under control of a user, or "uncirculated," e.g., under custody of an entity (e.g., in production, in a warehouse, in another public portal, in transport, etc.).

If the flag 206 indicates that the resource object is not under control of a user, e.g., if the flag indicates that a resource object with the same serial number is currently in custody of a different public portal, has not yet been in circulation since its creation, or is in transport, in production, in a warehouse, etc., the system may determine with high confidence that since the resource object already in custody is genuine, the resource object being authenticated is potentially fraudulent. In response to determining (e.g., using determination subsystem 114), based on the status data, that the resource object is not under control of the user or another user, generation subsystem 116 may generate a command to escalate the resource object for further processing.

Alternatively, or additionally, if the resource object is determined (e.g., by determination subsystem 114) to be under control of the user or another user (e.g., in circulation), authentication system 110 may determine, e.g., using determination subsystem 114, a threshold distance based on an elapsed time difference between the last recorded time 204 included in the status data and the time at which the resource object was received at the public portal. For example, if a ticket or other item having the same serial number was input into two different public portals within an hour, the threshold distance may be determined based on a distance that can feasibly be traveled within an hour. For example, determination subsystem 114 may determine, based on an elapsed time (e.g., 53 minutes), a threshold distance representing a distance that could be traveled within the elapsed time (e.g., 88.32 miles). If the threshold distance is exceeded, it may indicate that the same resource object could not possibly have traveled such a distance since the last recorded time at which it was received at a public portal, and as such, it may indicate that either the resource object currently being authenticated and/or the resource object last recorded and received at a different public portal is likely fraudulent.

In response to determining that a distance between a location of the public portal and the last recorded location 202 exceeds the threshold distance, authentication system 110 may generate a command to escalate the resource object for further processing, e.g., using generation subsystem 116. As described herein, further processing could include closing or preventing the user from using resource objects associated with the user or preventing the usage of the specific resource object. For example, authentication system 110 may determine a user account using the user authentication data and generate a command for preventing usage of resource objects associated with the user account. The command may be transmitted to a remote server or device (e.g., other public portals) via communication subsystem 112 and network 150.

Alternatively, or additionally, the system may generate, using the unique resource identifier, a command for preventing usage of the resource object, e.g., at least until further checks are performed to confirm whether the resource object is genuine or a fraudulent resource object. Authentication system 110 may also transmit to remote server 140 a request to update status data of the resource, wherein the request includes the location of the public portal and the time at which the resource object was received at the public portal.

Further processing may also include further checks to confirm whether the resource object is genuine or a fraudulent resource object. For example, if the resource object is a monetary bill, the serial number may identify a year during which the bill is printed, which has certain visual and physical identifiers that are different (e.g., design aspects may be different). Further processing could include evaluating physical characteristics, e.g., as recorded using imaging sensors 118A-N. The serial number may also be specific to a denomination of bill, and the system may confirm that the denomination of the deposited bill matches the denomination indicated by the serial number. The serial number can be checked against a database of outdated bills removed from circulation as well.

Additionally, or alternatively, further processing may include activation of security controls such as transmitting a notification (e.g., to a remote server, to the entity, to the user via the interface of the public portal), capturing an image of the bill, disabling recycling of the automated teller machine, and/or the like. The security controls can include applying a notice or flag to an account associated with the deposit and capturing evidentiary data as a security action (e.g., an image of the bill or user). For example, the system can capture image data, video data, a timestamp, or an identification of the user via the automated teller machine upon determining the match. The system can direct a camera system of an automated teller machine to capture images. The system can forward the evidentiary data to law enforcement, a financial institution, the user, and/or the like.

In an example where the public portal is an automated teller machine and the resource is a monetary deposit, e.g., of a bill, authentication system 110 can disable a recycling feature of the automated teller machine. The recycling feature recycles deposited bills such that they can be dispensed by the automated teller machine. The recycling feature can be disabled such that a potentially fraudulent resource, e.g., a counterfeit bill, cannot be further dispensed. Public portal 130A can sort the bill such that the bill is not dispensed by the automated teller machine. In other embodiments, authentication system 110 can notify the user that the bill deposited is possibly a counterfeit bill.

Figure 3:
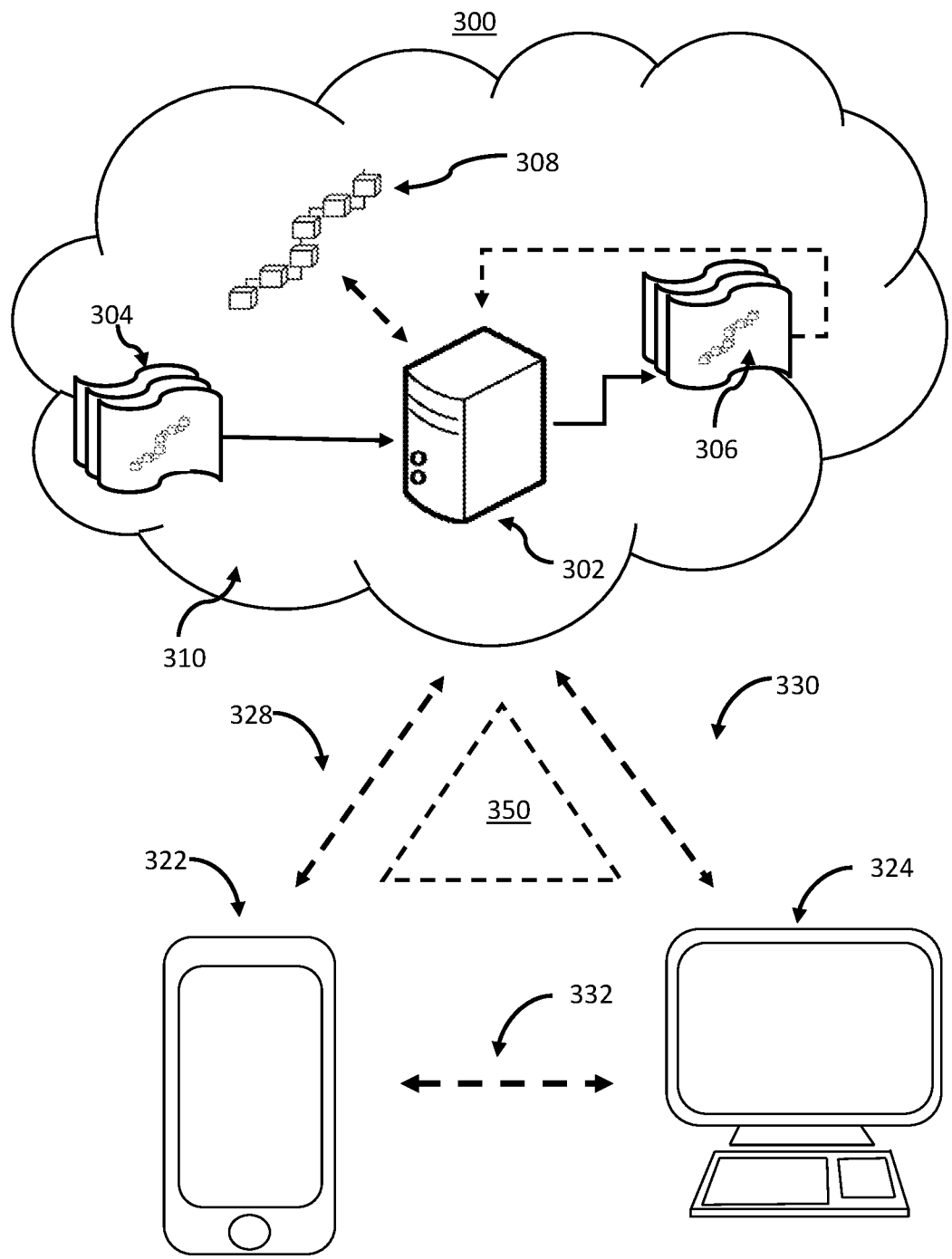
FIG. 3 shows illustrative components for a system used to authenticate resource objects at a public portal, in accordance with one or more embodiments.

FIG. 3 shows illustrative components for a system used to authenticate resource objects at a public portal, in accordance with one or more embodiments. As shown in FIG. 3, system 300 may include mobile device 322 and user terminal 324. While shown as a smartphone and a personal computer, respectively, in FIG. 3, it should be noted that mobile device 322 and user terminal 324 may be any computing device, including, but not limited to, a laptop computer, a tablet computer, a hand-held computer, and other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system and may feature one or more component devices. It should also be noted that system 300 is not limited to three devices.

Users may, for instance, utilize one or more devices to interact with one another, one or more servers, or other components of system 300. It should be noted that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or a user output interface (e.g., a display) for use in receiving and displaying data. For example, as shown in FIG. 3, both mobile device 322 and user terminal 324 include a display upon which to display data (e.g., conversational responses, queries, and/or notifications).

Additionally, as mobile device 322 and user terminal 324 are shown as a touchscreen smartphone and a personal computer, respectively, these displays also act as user input interfaces. It should be noted that in some embodiments, the devices may have neither user input interfaces nor displays and may instead receive and display content using another device (e.g., a dedicated display device such as a computer screen and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Cloud components 310 may include aspects of authentication system 110, such as communication subsystem 112, determination subsystem 114, generation subsystem 116, aspects of public portals 130A-N, remote server 140, and database(s) 142.

Cloud components 310 may access blockchain network 308 (e.g., which in some embodiments may correspond to a blockchain). Additionally, cloud components 310 may access database(s) 142 and remote server 140.

Cloud components 310 may include model 302, which may be a machine learning model, an artificial intelligence model, a deep learning model, etc. (which may be referred to collectively as "models" herein). Model 302 may take inputs 304 and provide outputs 306. The inputs may include multiple datasets, such as a training dataset and a test dataset. Each of the plurality of datasets (e.g., inputs 304) may include data subsets related to user data, predicted forecasts and/or errors, and/or actual forecasts and/or errors. In some embodiments, outputs 306 may be fed back to model 302 as input to train model 302 (e.g., alone or in conjunction with user indications of the accuracy of outputs 306, labels associated with the inputs, or other reference feedback information). For example, the system may receive a first labeled feature input, wherein the first labeled feature input is labeled with a known prediction for the first labeled feature input. The system may then train the first machine learning model to classify the first labeled feature input with the known prediction.

In a variety of embodiments, model 302 may update its configurations (e.g., weights, biases, or other parameters) based on the assessment of its prediction (e.g., outputs 306) and reference feedback information (e.g., user indication of accuracy, reference labels, or other information). In a variety of embodiments, where model 302 is a neural network, connection weights may be adjusted to reconcile differences between the neural network's prediction and reference feedback. In a further use case, one or more neurons (or nodes) of the neural network may require that their respective errors be sent backward through the neural network to facilitate the update process (e.g., backpropagation of error). Updates to the connection weights may, for example, be reflective of the magnitude of error propagated backward after a forward pass has been completed. In this way, for example, model 302 may be trained to generate better predictions.

In some embodiments, model 302 may include an artificial neural network. In such embodiments, model 302 may include an input layer and one or more hidden layers. Each neural unit of model 302 may be connected with many other neural units of model 302. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 302 may be self-learning and trained, rather than explicitly programmed, and can perform significantly better in certain areas of problem solving, as compared to traditional computer programs. During training, an output layer of model 302 may correspond to a classification of model 302, and an input known to correspond to that classification may be input into an input layer of model 302 during training. During testing, an input without a known classification may be input into the input layer, and a determined classification may be output.

In some embodiments, model 302 may include multiple layers (e.g., where a signal path traverses from front layers to back layers). In some embodiments, backpropagation techniques may be utilized by model 302 where forward stimulation is used to reset weights on the "front" neural units. In some embodiments, stimulation and inhibition for model 302 may be more free-flowing, with connections interacting in a more chaotic and complex fashion. During testing, an output layer of model 302 may indicate whether or not a given input corresponds to a classification of model 302. In some embodiments, the model (e.g., model 302) may automatically perform actions based on outputs 306. In some embodiments, the model (e.g., model 302) may not perform any actions.

System 300 also includes application programming interface (API) layer 350. API layer 350 may allow the system to generate summaries across different devices. In some embodiments, API layer 350 may be implemented on mobile device 322 or user terminal 324. Alternatively or additionally, API layer 350 may reside on one or more of cloud components 310. API layer 350 (which may be a REST or Web services API layer) may provide a decoupled interface to data and/or functionality of one or more applications. API layer 350 may provide a common, language-agnostic way of interacting with an application. Web services APIs offer a well-defined contract, called WSDL, that describes the API's services in terms of its operations and the data types used to exchange information. REST APIs do not typically have this contract; instead, they are documented with client libraries for most common languages, including Ruby, Java, PHP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: front-end layer and back-end layer, where microservices reside. In this kind of architecture, the role of the API layer 350 may provide integration between front-end and back-end layers. In such cases, API layer 350 may use RESTful APIs (exposition to front-end or even communication between microservices). API layer 350 may use AMQP (e.g., Kafka, RabbitMQ, etc.). API layer 350 may employ incipient usage of new communications protocols such as gRPC, Thrift, etc.

In some embodiments, the system architecture may use an open API approach. In such cases, API layer 350 may use commercial or open-source API platforms and their modules. API layer 350 may use a developer portal. API layer 350 may use strong security constraints applying WAF and DDOS protection, and API layer 350 may use RESTful APIs as standard for external integration.

Figure 4:
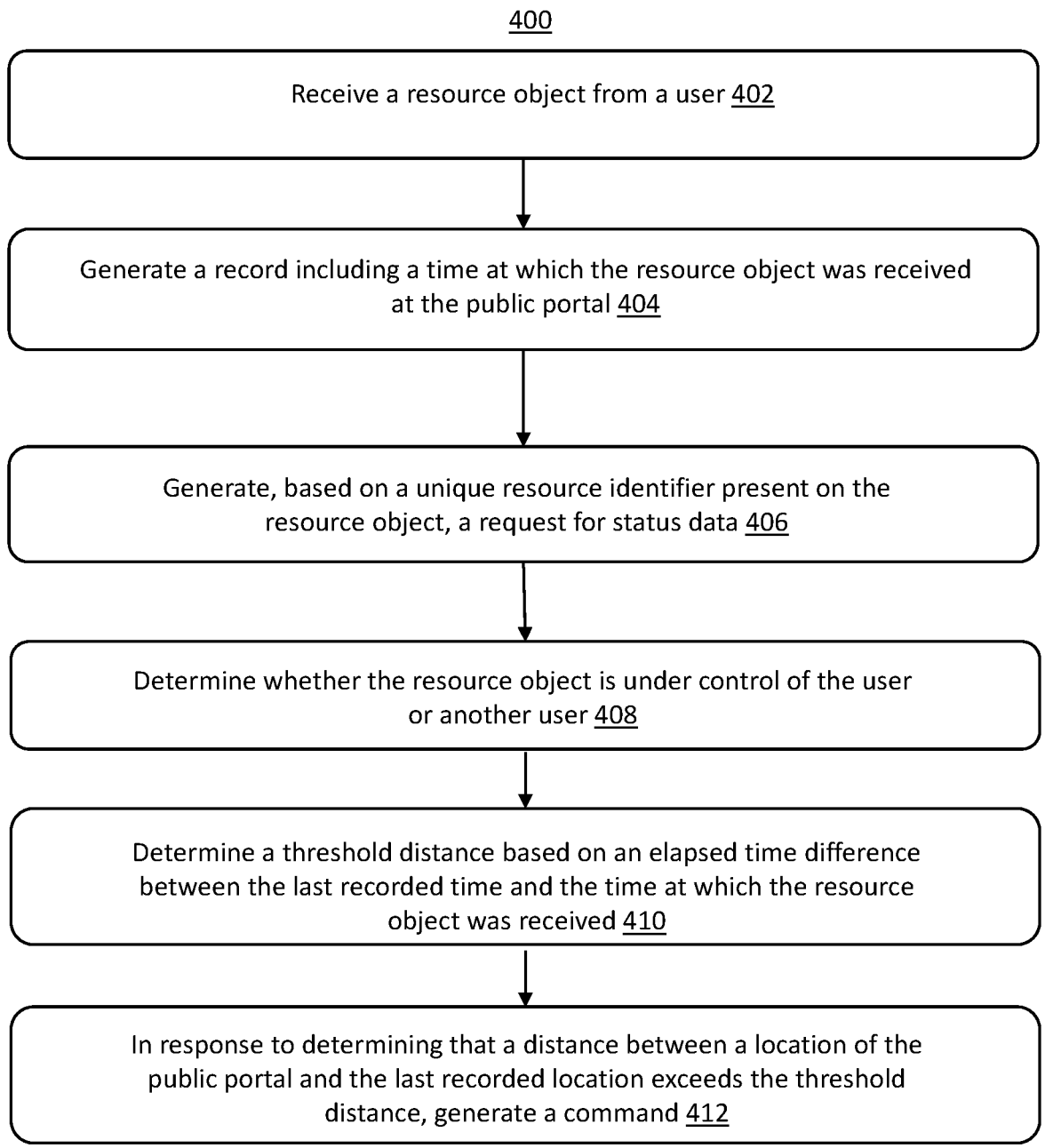
FIG. 4 is a flowchart of operations for performing authentication of resource objects at a public portal, in accordance with one or more embodiments of this disclosure.

FIG. 4 is a flowchart of operations involved in performing authentication of resource objects (e.g., products, items, etc.) at a public portal (e.g., public portal 130A), in accordance with one or more embodiments of this disclosure. For example, the system may use process 400 (e.g., as implemented on one or more system components described above with respect to FIG. 1 or FIG. 3) in order to enable authentication of resource objects, such as monetary deposits by a user at an automated teller machine.

At step 402, process 400 may include receiving a resource object from a user, e.g., at a public portal. In some embodiments, a user may insert a resource object at a receptacle of a public portal such as public portal 130A, e.g., in order to use the resource object in some capacity, or to authenticate the resource object. In one example, the user may insert a monetary deposit via a receptacle at an automated teller machine. The automated teller machine may automatically perform authentication upon receiving a deposit at the receptacle.

Public portal 130A may also receive other information, such as user authentication data, e.g., via an interface of public portal 130A. For example, prior to making a deposit, a user may input their card or user account information as well as a PIN to authenticate themselves at the public portal. The public portal may transmit this information to a remote server to confirm the user is the correct user (e.g., the PIN is correct).

At step 404, process 400 may include generating a record including a time at which the resource object was received at the public portal. For example, authentication system 110 may, in response to receiving the resource object, generate a record including a time at which the resource object was received at the public portal. The record may also include other information, such as the unique identifier of the resource object, an image of the resource object, a location of the public portal at which the resource object was inserted, information regarding the user (e.g., user authentication information), etc.

At step 406, process 400 may include generating, based on a unique resource identifier present on the resource object, a request for status data. For example, generation subsystem 116 may generate a request for status data associated with the unique resource identifier. As described herein, the unique resource identifier present on the resource object may be determined using one or more imaging sensors, such as one or more cameras. The system may perform OCR to determine an alphanumeric string of numbers representing a unique value assigned to the resource object.

According to some examples, the status data includes (1) a flag indicating whether a resource object associated with the unique resource identifier is under control of the user or another user and (2) a last recorded time and a last recorded location associated with the unique resource identifier being scanned at the public portal or another public portal.

In some examples, the method further includes transmitting, to a remote server, the request for status data associated with the unique resource identifier, wherein the request includes the unique resource identifier and the user authentication data, and receiving, from the remote server, the status data. In the example in which the resource object is one or more bills of a monetary deposit, at least part of the bill may be scanned to obtain an image of the unique resource identifier, e.g., serial number of the bill. Authentication system 110 may then generate a request for information associated with the serial number, e.g., from a remote server and/or database.

At step 408, process 400 may include determining whether the resource object is under control of the user or another user. For example, in response to receiving the status data, authentication system 110 may determine, based on the flag included in the status data, whether the resource object is under control of the user or another user. For example, flag statuses may include whether the resource object is in circulation, e.g., in the custody or under control of a user, or not in circulation, e.g., in the custody or under control of an entity. For example, if the resource object is a monetary bill, the status may be "in circulation" if the bill is being actively used in transactions by a user, "uncirculated" if the bill has never been used in transactions, and/or "outdated" if the bill is no longer being produced, etc.

In some examples, in response to determining, based on the status data, that the resource object is not under control of the user or another user (e.g., not in circulation), authentication system 110 may generate a command to escalate the resource object for further processing. For example, further processing may include preventing usage of the resource object, preventing usage of the resource object by the specific user, preventing a user from using resource objects associated with the user, transmitting information regarding the bill for further checks as described herein, and/or the like.

At step 410, process 400 may include determining a threshold distance based on an elapsed time difference between the last recorded time and the time at which the resource object was received, e.g., in response to determining that the resource object is under control of the user or another user.

For example, if a serial number for a monetary bill was seen at both a first and a second distinct automated teller machine within an hour, the threshold distance may be determined to be, e.g., 89 miles. For example, if the distance between the two automated teller machines exceeds 89 miles, one of the bills at the machines may be determined to be potentially fraudulent, given that it is infeasible, impossible, or unlikely that a user traveled more than 89 miles within the elapsed time of 1 hour. The threshold distance may be calculated using a function with the elapsed time as an input or calculated as a function of elapsed time as well as terrain, weather, etc. based on the last recorded time and location of the resource object. In some examples, the threshold distance may be calculated using a map system capable of estimating threshold distances based on elapsed time as well as location and time (e.g., considering traffic at the last recorded location and last recorded time, etc.).

At step 412, process 400 may include, in response to determining that a distance between a location of the public portal and the last recorded location exceeds the threshold distance, generating a command. In some examples, the command may be a command to escalate the resource object for further processing.

For example, further processing could include closing or preventing the user from using resource objects associated with the user or preventing usage of the specific resource object. In one example, generating a command to escalate the resource object for further processing may include generating, using the unique resource identifier, a command for preventing usage of the resource object. Alternatively, or additionally, the system may determine a user account using the user authentication data and generate a command for preventing usage of resource objects associated with the user account.

It is contemplated that the steps or descriptions of FIG. 4 may be used with any other embodiment of this disclosure. In addition, the steps and descriptions described in relation to FIG. 4 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 4.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment can be combined with one or more features of any other embodiment.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method comprising: receiving, at a public portal, a resource object from a user; in response to receiving the resource object, generating a record including a time at which the resource object was received at the public portal; generating, based on a unique resource identifier present on the resource object, a request for status data associated with the unique resource identifier, wherein the status data includes (1) a flag indicating whether a resource object associated with the unique resource identifier is under control of the user or another user and (2) a last recorded time and a last recorded location associated with the unique resource identifier being scanned at the public portal or another public portal; in response to receiving the status data, determining, based on the flag included in the status data, whether the resource object is under control of the user or another user; in response to determining that the resource object is under control of the user or another user, determining a threshold distance based on an elapsed time difference between the last recorded time included in the status data and the time at which the resource object was received at the public portal; and in response to determining that a distance between a location of the public portal and the last recorded location exceeds the threshold distance, generating a command to escalate the resource object for further processing.

2. A method comprising: receiving, at a public portal, user authentication data for a user and a resource object from the user; in response to receiving the resource object, generating a record including a time at which the resource object was received at the public portal; determining, using one or more imaging sensors, a unique resource identifier present on the resource object; generating, based on the unique resource identifier, a request for status data associated with the unique resource identifier, wherein the status data includes (1) a flag indicating whether a resource object associated with the unique resource identifier is under control of the user or another user and (2) a last recorded time and a last recorded location associated with the unique resource identifier being scanned at the public portal or another public portal; in response to receiving the status data, determining, based on the flag included in the status data, whether the resource object is under control of the user or another user; in response to determining that the resource object is under control of the user or another user, determining a threshold distance based on an elapsed time difference between the last recorded time included in the status data and the time at which the resource object was received at the public portal; determining whether a distance between a location of the public portal and the last recorded location exceeds the threshold distance; and in response to determining that the distance exceeds the threshold distance, generating a command to escalate the resource object for further processing.

3. A method comprising: in response to receiving a resource object at a public portal from a user, generating a record including a time at which the resource object was received at the public portal; generating, based on a unique resource identifier present on the resource object, a request for status data associated with the unique resource identifier, wherein the status data includes (1) a flag indicating whether a resource object associated with the unique resource identifier is under control of the user or another user and (2) a last recorded time and a last recorded location associated with the unique resource identifier being scanned at the public portal or another public portal; in response to receiving the status data, determining, based on the flag included in the status data, whether the resource object is under control of the user or another user; in response to determining that the resource object is under control of the user or another user, determining a threshold distance based on an elapsed time difference between the last recorded time included in the status data and the time at which the resource object was received at the public portal; and in response to determining that a distance between a location of the public portal and the last recorded location exceeds the threshold distance, generating a command to escalate the resource object for further processing.

4. The method of any of the preceding embodiments, further comprising determining, using one or more imaging sensors, the unique resource identifier present on the resource object.

5. The method of any of the preceding embodiment, further comprising receiving, at the public portal, user authentication data for the user.

6. The method of any of the preceding embodiments, wherein generating a command to escalate the resource object for further processing comprises: determining a user account using the user authentication data; and generating a command for preventing usage of resource objects associated with the user account.

7. The method of any of the preceding embodiments, further comprising transmitting, to a remote server, the request for status data associated with the unique resource identifier, wherein the request includes the unique resource identifier and the user authentication data; and receiving, from the remote server, the status data.

8. The method of any of the preceding embodiments, further comprising: in response to determining, based on the status data, that the resource object is not under control of the user or another user, generating a command to escalate the resource object for further processing.

9. The method of any of the preceding embodiments, further comprising transmitting, to a remote server, a request to update status data, wherein the request includes (1) the location of the public portal and (2) the time at which the resource object was received at the public portal.

10. The method of any of the preceding embodiments, wherein generating a command to escalate the resource object for further processing comprises generating, using the unique resource identifier, a command for preventing usage of the resource object.

11. A tangible, non-transitory, machine-readable medium (e.g., computer-readable medium) storing instructions that, when executed by a data processing apparatus, cause the data processing apparatus to perform operations comprising those of any of embodiments 1-10.

12. A system comprising: one or more processors; and memory storing instructions that, when executed by the one or more processors, cause the processors to effectuate operations comprising those of any of embodiments 1-10.

13. A system comprising means for performing any of embodiments 1-10.

14. A system comprising cloud-based circuitry for performing any of embodiments 1-10.

What is claimed is:

1. A system, comprising:
one or more processors; and
one or more non-transitory computer-readable media storing instructions that, when executed by the one or more processors, cause operations comprising:
receiving, at a public portal, user authentication data for a user and a resource object from the user;
in response to receiving the resource object, generating a record including a time at which the resource object was received at the public portal;
determining, using one or more imaging sensors, a unique resource identifier present on the resource object;
generating, based on the unique resource identifier, a request for status data associated with the unique resource identifier, wherein the status data includes (1) a flag indicating whether a resource object associated with the unique resource identifier is under control of the user or another user and (2) a last recorded time and a last recorded location associated with the unique resource identifier being scanned at the public portal or another public portal;
in response to receiving the status data, determining, based on the flag included in the status data, whether the resource object is under control of the user or another user;
in response to determining that the resource object is under control of the user or another user, determining a threshold distance based on an elapsed time difference between the last recorded time included in the status data and the time at which the resource object was received at the public portal;
determining whether a distance between a location of the public portal and the last recorded location exceeds the threshold distance; and
in response to determining that the distance exceeds the threshold distance, generating a command to escalate the resource object for further processing.

2. The system of claim 1, wherein the instructions cause the one or more processors to perform operations comprising:
transmitting, to a remote server, the request for the status data associated with the unique resource identifier, wherein the request includes the unique resource identifier and the user authentication data; and
receiving, from the remote server, the status data.

3. The system of claim 1, wherein the instructions cause the one or more processors to perform operations comprising:
in response to determining, based on the status data, that the resource object is not under control of the user or another user, generating a command to escalate the resource object for further processing.

4. The system of claim 1, wherein the instructions cause the one or more processors to perform operations comprising:
transmitting, to a remote server, a request to update the status data, wherein the request to update includes (1) the location of the public portal and (2) the time at which the resource object was received at the public portal.

5. A method, the method comprising:
receiving, at a public portal, a resource object from a user associated with user authentication data;
in response to receiving the resource object, generating a record including a time at which the resource object was received at the public portal;
generating, based on a unique resource identifier present on the resource object, a request for status data associated with the unique resource identifier, wherein the status data includes (1) a flag indicating whether a resource object associated with the unique resource identifier is under control of the user or another user and (2) a last recorded time and a last recorded location associated with the unique resource identifier being scanned at the public portal or another public portal;
in response to receiving the status data, determining, based on the flag included in the status data, whether the resource object is under control of the user or another user;
in response to determining that the resource object is under control of the user or another user, determining a threshold distance based on an elapsed time difference between the last recorded time included in the status data and the time at which the resource object was received at the public portal; and
in response to determining that a distance between a location of the public portal and the last recorded location exceeds the threshold distance, generating a command to escalate the resource object for further processing.

6. The method of claim 5, further comprising determining, using one or more imaging sensors, the unique resource identifier present on the resource object.

7. The method of claim 5, further comprising receiving, at the public portal, the user authentication data for the user.

8. The method of claim 7, wherein generating the command to escalate the resource object for further processing comprises:
determining a user account using the user authentication data; and
generating instructions for preventing usage of resource objects associated with the user account.

9. The method of claim 7, further comprising:
transmitting, to a remote server, the request for the status data associated with the unique resource identifier, wherein the request includes the unique resource identifier and the user authentication data; and
receiving, from the remote server, the status data.

10. The method of claim 5, further comprising:
in response to determining, based on the status data, that the resource object is not under control of the user or another user, generating the command to escalate the resource object for further processing.

11. The method of claim 5, further comprising:
transmitting, to a remote server, a request to update the status data, wherein the request to update includes (1) the location of the public portal and (2) the time at which the resource object was received at the public portal.

12. The method of claim 5, wherein generating the command to escalate the resource object for further processing comprises:
generating, using the unique resource identifier, a command instructions for preventing usage of the resource object.

13. One or more non-transitory computer-readable media storing instructions that, when executed by one or more processors, cause the one or more processors to perform operations comprising:
in response to receiving a resource object at a public portal from a user associated with user authentication data, generating a record including a time at which the resource object was received at the public portal;
generating, based on a unique resource identifier present on the resource object, a request for status data associated with the unique resource identifier, wherein the status data includes (1) a flag indicating whether a resource object associated with the unique resource identifier is under control of the user or another user and (2) a last recorded time and a last recorded location associated with the unique resource identifier being scanned at the public portal or another public portal;
in response to receiving the status data, determining, based on the flag included in the status data, whether the resource object is under control of the user or another user;
in response to determining that the resource object is under control of the user or another user, determining a threshold distance based on an elapsed time difference between the last recorded time included in the status data and the time at which the resource object was received at the public portal; and
in response to determining that a distance between a location of the public portal and the last recorded location exceeds the threshold distance, generating a command to escalate the resource object for further processing.

14. The one or more non-transitory computer-readable media of claim 13, wherein the instructions cause the one or more processors to perform operations comprising:
determining, using one or more imaging sensors, the unique resource identifier present on the resource object.

15. The one or more non-transitory computer-readable media of claim 13, wherein the instructions cause the one or more processors to perform operations comprising:
receiving, at the public portal, the user authentication data for the user.

16. The one or more non-transitory computer-readable media of claim 15, wherein the instructions cause the one or more processors to perform operations comprising:
transmitting, to a remote server, the request for the status data associated with the unique resource identifier, wherein the request includes the unique resource identifier and the user authentication data; and
receiving, from the remote server, the status data.

17. The one or more non-transitory computer-readable media of claim 15, wherein generating the command to escalate the resource object for further processing comprises:
determining a user account using the user authentication data; and
generating instructions for preventing usage of resource objects associated with the user account.

18. The one or more non-transitory computer-readable media of claim 13, further comprising:
in response to determining, based on the status data, that the resource object is not under control of the user or another user, generating the command to escalate the resource object for further processing.

19. The one or more non-transitory computer-readable media of claim 13, wherein the instructions cause the one or more processors to perform operations comprising:
transmitting, to a remote server, a request to update the status data, wherein the request to update includes (1) the location of the public portal and (2) the time at which the resource object was received at the public portal.

20. The one or more non-transitory computer-readable media of claim 13, wherein generating the command to escalate the resource object for further processing comprises generating, using the unique resource identifier, instructions for preventing usage of the resource object.

* * * * *